(12) United States Patent
Yona et al.

(10) Patent No.: US 8,213,064 B2
(45) Date of Patent: Jul. 3, 2012

(54) PERSONAL DISPLAY SYSTEM WITH EXTENDED FIELD OF VIEW

(75) Inventors: Zvi Yona, Karkur (IL); Sasson Abraham, Haifa (IL); Shmuel Shalom, Yokneam Illite (IL); Aron Arlievsky, Tirat Carmel (IL); Oded Hamburger, Haifa (IL)

(73) Assignee: Elbit Systems Ltd., Haifa (IL)

( * ) Notice: Subject to any disclaimer, the term of this patent is extended or adjusted under 35 U.S.C. 154(b) by 2282 days.

(21) Appl. No.: 09/818,575

(22) Filed: Mar. 28, 2001

(65) Prior Publication Data

US 2001/0048554 A1    Dec. 6, 2001

(30) Foreign Application Priority Data

Mar. 28, 2000   (IL) .......................................... 135334

(51) Int. Cl.
*G03H 1/02*   (2006.01)
*G02B 27/14*   (2006.01)

(52) U.S. Cl. ............ 359/13; 359/630; 359/15; 359/569; 353/30

(58) Field of Classification Search .................... 359/13, 359/14, 15, 565, 566, 465, 462, 630, 569, 359/22; 348/54, 55, 58, 57, 60; 353/7, 8, 353/9, 30, 31, 32, 37, 34, 48; 305/7, 8
See application file for complete search history.

(56) References Cited

U.S. PATENT DOCUMENTS

| | | | | |
|---|---|---|---|---|
| 4,647,142 | A * | 3/1987 | Boot | 359/13 |
| 4,682,029 | A * | 7/1987 | Diepeveen et al. | 250/330 |
| 4,968,117 | A * | 11/1990 | Chern et al. | 359/13 |
| 5,198,928 | A * | 3/1993 | Chauvin | 359/465 |
| 5,589,956 | A * | 12/1996 | Morishima et al. | 359/15 |
| 5,652,666 | A * | 7/1997 | Florence et al. | 359/22 |
| 5,917,459 | A * | 6/1999 | Son et al. | 359/13 |
| 5,982,343 | A * | 11/1999 | Iba et al. | 345/8 |
| 6,082,862 | A * | 7/2000 | Popovich | 353/30 |
| 6,094,283 | A * | 7/2000 | Preston | 359/15 |

OTHER PUBLICATIONS

Melzer, James E. and Moffitt, Kirk. Head Mounted Displays: Designing for the User, 1997. p. 90-95, McGraw-Hill, USA. ISBN 0-07-041819-5.

* cited by examiner

*Primary Examiner* — Audrey Y Chang

(57) ABSTRACT

A system and method for providing extended field of view. In one embodiment, the present invention is directed to provide extended field of view for a user of a personal display system. The system may include an image source coupled to relay optics, to redirecting unit and to reflecting unit, and may optionally be mounted in a helmet.

38 Claims, 4 Drawing Sheets

US 8,213,064 B2

PERSONAL DISPLAY SYSTEM WITH EXTENDED FIELD OF VIEW

FIELD OF INVENTION

The current invention relates to personal display systems in general, and to head mounted personal display systems in more particular.

BACKGROUND OF THE INVENTION

It is often desirable to display off of the visor of a helmet an optical image. This is generally useful for applications such as flight borne helmets where the viewer (e.g. a pilot) desires to see pictures or symbols reflected off the visor.

Reference is now made to FIG. 1A describing a typical helmet-mounted, prior art optical system involving a visor. The helmet typically comprises an image source 30 and relay optics 10. A picture is relayed from source 30, through Relay Optics 10, reflected off a visor 15 or combiner element, and into the viewer's eye 16, such as a pilot. In a typical system that establishes a conforming head wearing unit, the field of view (FOV) received by the user is limited due to both limited eye relief and limited optics diameter. Typically a reduced FOV of 30° to 40° is achieved, as could be seen in FIG. 1B. FIG. 1B is a graph published in the article "Head Mounted Displays" By Jams E. Melzer & Kirk Moffitt (ISBN 0-07-041819-5) that presents the FOV as a function of the eye relief and the optics diameter. According to the graph of FIG. 1B it can easily be seen that for eye relief of 20 mm and optics diameter of 20 mm the FOV is approximately 35 degrees. It is obvious that with airborne systems the eye relief and the optics diameter are tightly limited. Furthermore the actual FOV is even lower due to aberrations introduced by the visor shape. Increasing the FOV with the present art requires a substantial reduction in resolution and a substantially larger and heavier relay optics and helmet. As an example, in order to enlarge the FOV to 60°, the relay optics must be heavier than the one used for a FOV of 40°.

SUMMARY OF THE INVENTION

There is provided, in accordance with a preferred embodiment of the current invention, an apparatus for increasing the field of view of an image without substantially increasing the size and the weight of a relay optics of the apparatus. The apparatus includes an image source for producing an image, relay optics with a first field of view, for optically transferring the image, a redirecting unit for selectively directing complementary fractions of the image at at least two angles and a reflecting unit for reflecting the image to a viewer. The redirecting unit is switching between these angles at a speed high enough so that the image received by the viewer is seamlessly integrated and the resultant field of view at the reflecting unit is wider than the first field of view.

LIST OF DRAWINGS

The present invention will be understood and appreciated more fully from the following detailed description taken in conjunction with the appended drawings in which.

A DETAILED DESCRIPTION OF THE PRESENT INVENTION

An optical system is disclosed, utilizing relay optics and visor, with increased FOV and using a lightweight relay optics. According to the current invention the image projected to the viewer 16 is composed of two or more fractions, each is displayed utilizing substantially full FOV of the relay optics (which has smaller FOV compared with the combined total FOV). The FOV for the viewer is achieved without substantially increasing the system's weight and without substantially lowering the resolution of the projected image.

Figure 1A:
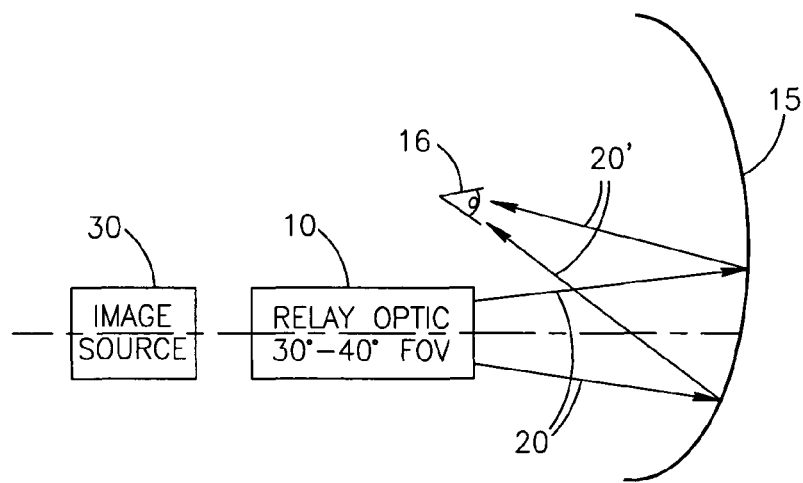
FIG. 1A is a schematic illustration of a prior art optical image display on a helmet.
Figure 1B:
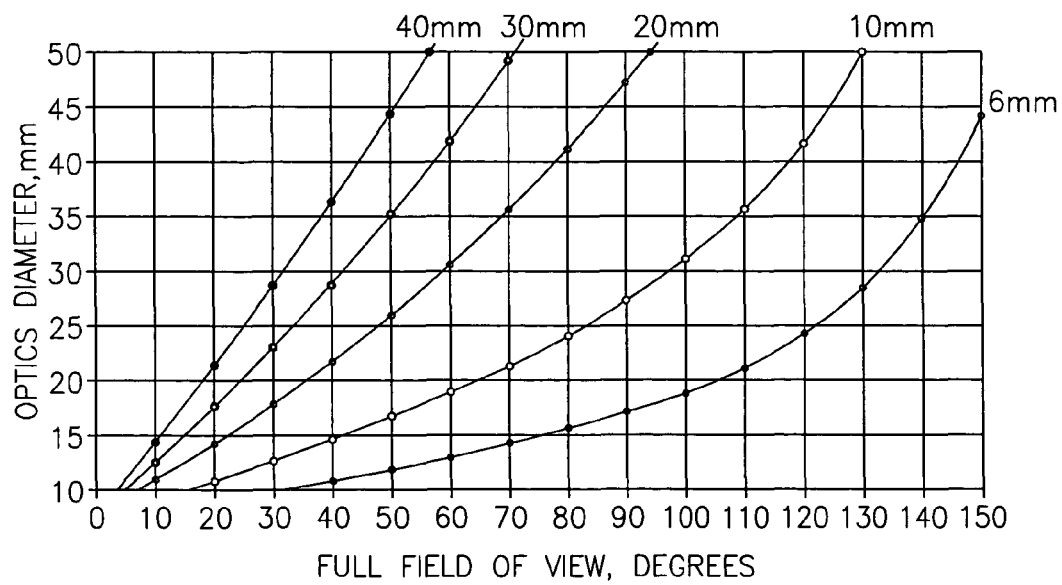
FIG. 1B is a graph showing the FOV as a function of the eye relief and the optics diameter.
Figure 2A:
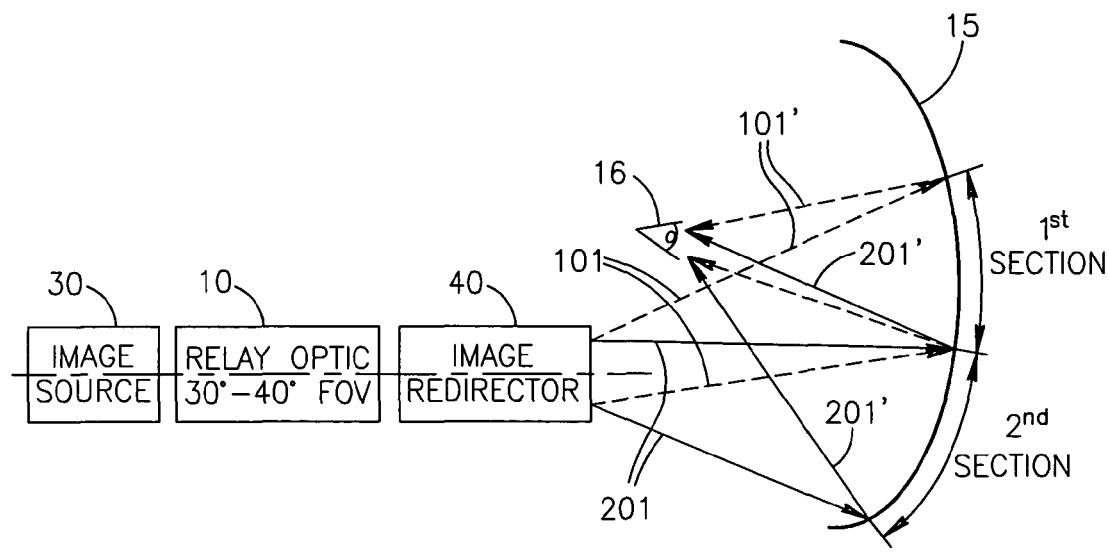
FIG. 2A is a schematic illustration of the optical image display on a helmet in accordance with a preferred embodiment of the invention.

FIG. 2A illustrates a preferred embodiment of the current invention according to which an image is produced by image source 30, received by relay optics 10, deviated/reflected at a high speed in more than one direction by image redirector 40, and superimposed in visor 15 in more than one location. The images, from more than one location, reflect off the visor 15 and are received by the eye of the user 16. Since the switch between the image fractions being projected onto the different locations on the visor happens at a high speed, the eye does not detect said switching and the over-all image received by the viewer's eyes is a seamless superimposition of the different fractions of the image. The total FOV (TFOV) is thus increased roughly according to the number of the image fractions. The seamless integration of the images, from plurality of fractions of an image to a whole image, becomes possible due to the high rate, time-integration performed by the eye of the viewer and viewed as one wide image. Seamless integration of the different fractions of the full image become possible also by using known techniques such as creating the fractions so as to slightly overlap each other, and by controlling the intensity of the image of each fraction in the overlap zone to gradually decrease as the distance to the edge of the image fraction becomes smaller.

According to the embodiment of the system in FIG. 2A, the projected image is split into two fractions 101 and 201, with substantially equal angle. The two images, image 101 reflected as image 101' to the left and image 201 reflected as image 201' to the right, one at a time in an alternating rate typically higher than 1 cycle each 25 milliseconds. Both images are reflected from the visor onto the viewer's eyes and received as one by the eye of the user, resulting in a field of view wider than that of each image singly. It is noted that this embodiment is capable of producing multiple image fractions through one relay optics thus creating an integrated image with FOV substantially wider of the relay optics FOV by the number of the fractions.

The image redirector 40 may be one of:
tilting mirror, or
electro-optic lens—liquid crystal based diffractive lens, which receives electrical impulses for different reflective or deviated angles (such as Electrically Switchable Holographic Optical Element (ESHOE) by DigiLens Technologies Inc. of Sunnyvale, Calif., USA), or Hologram.

Digital Micromirror Device (DMD) or Digital Light Processing (DLP) made by Texas Instruments or Light Valve Mirror (LVM) made by IBM montation or similar with two stages (black & white pictures), or any other type of device that can switch\divert the light from one direction to more than one direction.

The movement of the projected fractions of the image on the visor is non-detectable by the eye using a repetition rate of 25 mill-seconds or less. The movement of the deviator/reflector in image redirector 40 is synchronized with the image source so as to allow for the projection of each of the image fractions onto its respectively correct position on the visor 15. The eye performs time integration to receive the large TFOV. It is useful to note that according to the present invention, in order to achieve a wider TFOV, the helmet experiences a weight increase of only about 10%, while the quality of the larger image remains as high as with the prior art narrow FOV.

Figure 2B:
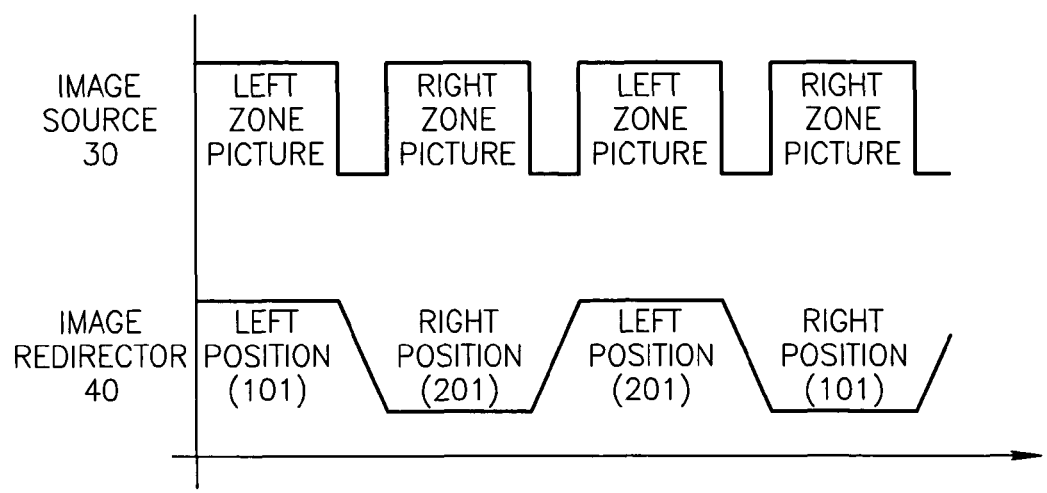
FIG. 2B is a schematic illustration of a time sequential of the operation of the apparatus detailed in FIG. 2A.

Reference is now made to FIG. 2B, a time sequential of the operation of the apparatus detailed in FIG. 2A, when operating as time domain device (i.e. an operation in which the different fractions of the image employ different time slots for projection). Note that the top line depicts the selective image fractions produced by image source unit 30, first image 101 and second image 201, and the bottom line depicts the reflective position of the image redirector 40, image 101 to the left and image 201 to the right. Thus, it is clear that the image source 30 has to be synchronized with the image redirector when operating as a time-domain device. It should be noted that the examples depicted in FIGS. 2A and 2B employ two fractions of an image, but the invention is not limited by this example, and the total image may be combined of more than two fractions.

Figure 3:
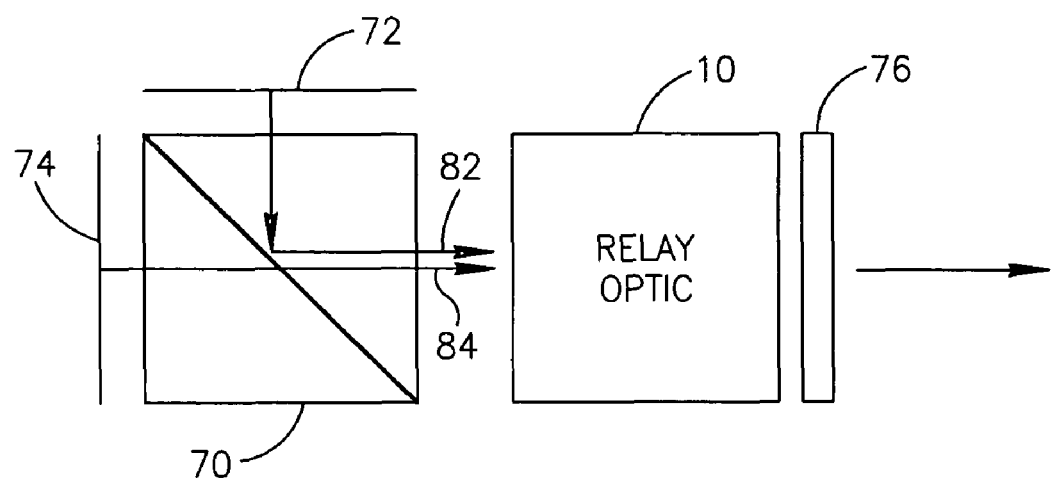
FIG. 3 is a schematic illustration of an alternative embodiment of the present invention.

FIG. 3 is a schematic illustration of an alternative embodiment of the present invention. The image produced in image source 30 is divided into two complementary frames, 72 with polarization P, and 74 with polarization S. Frame 72 represents the fraction of the source image that corresponds to the first section on visor 15. Frame 74 represents the fraction of the source image that corresponds to the second section on visor 15. Both frames are projected through an optical combiner 70, and their respective out going optical lines 82 and 84 are projected simultaneously along a common optical axis from the optical combiner 70 through the relay optics 10 and optionally via an Electro Optical (EO) lens 76. The optical combiner 70 may be any of the existing combiner / splitter such as those manufactured and distributed by KARL Lambrecht Co. Chicago, Ill., USA. The need for EO lens is dependent on the embodiment of the image redirector 40, as will be explained below. When the EO lens 76 is in use, its activity is synchronized with the image source so as to allow the free passage of only one of the frames, 72 or 74. The image received from relay optics 10, whether projected via EO lens 76 or not, is then projected through image redirector 40.

Figure 4A:
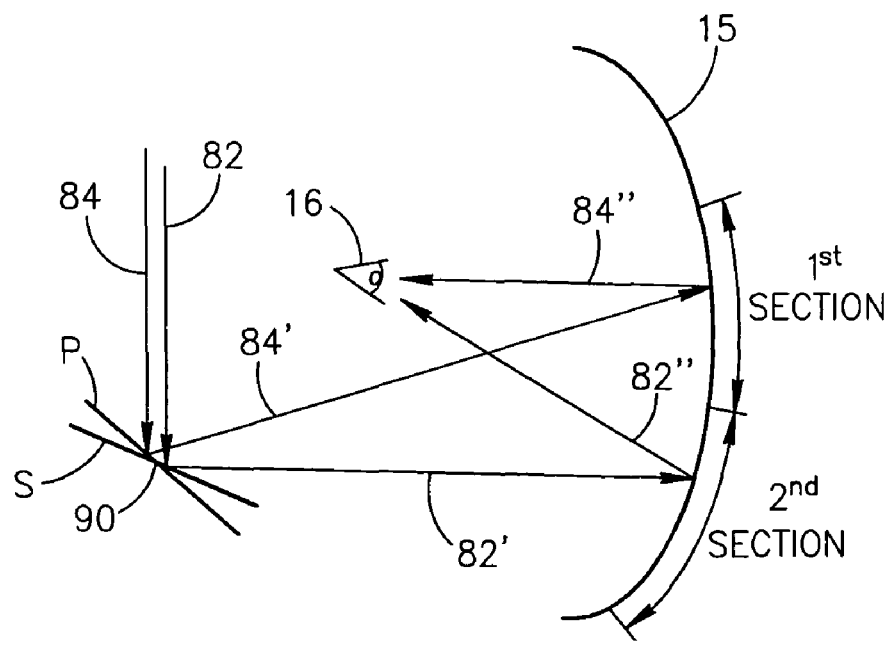
FIGS. 4A and 4B are schematic illustrations of detailed views of two embodiments of the current invention.
Figure 4B:
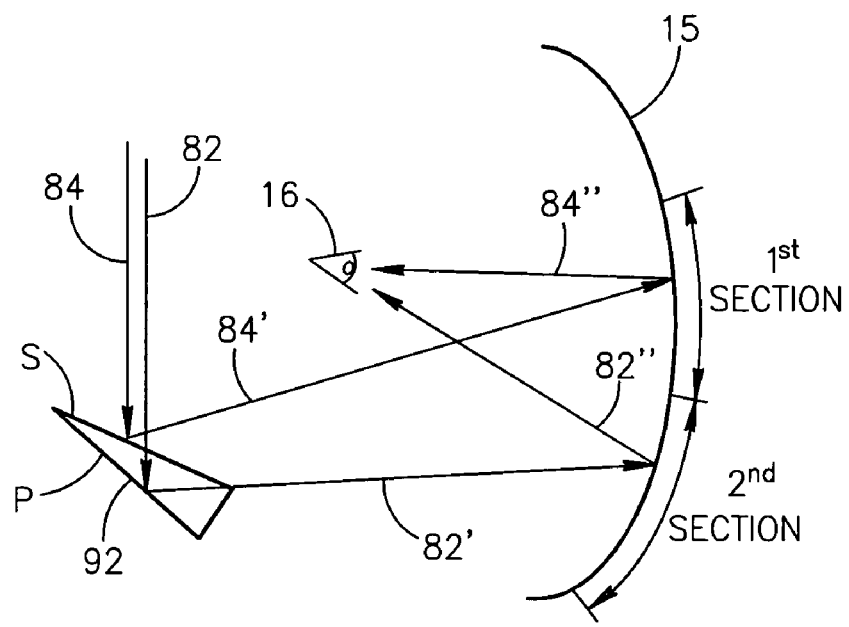

FIGS. 4A and 4B illustrate different embodiments of image redirector 40.

FIG. 4A illustrates an embodiment of image redirector 40, where the reflection angle is controlled in time, and may get two or more values. When the embodiment illustrated in FIG. 3 is used, image redirector 40 of FIG. 2A may be embodied by device 90 that reflects the image received from relay optics 10 (not shown), via EO lens (not shown) onto device 90. Device 90 is a controllable redirector that may reflect the inbound image in two different angles. Image 72 with polarization P (not shown) is enabled through EO lens 76, symbolized by arrow 82 representing a midline of the image. Image 72 approaches device 90 that is then controlled into status P so to reflect image 72 along midline 82' onto visor 15, and from visor 15 along mid-line 82" to the viewer 16. The same process takes place with image 74 of polarization S, represented by midlines 84, 84' and 84" respectively. EO lens 76 is synchronized with the activation of device 90 according to the principles illustrated in FIG. 2B, where EO lens is activated according to the upper sequential and device 90 according to the lower sequential.

FIG. 4B illustrates another embodiment of the current invention, in which image redirector 40 of FIG. 2A (not shown) is embodied by an optical device 92 (such as, for example, a wedge with two polarization-dependent reflective planes). In this embodiment, the reflection angle depends only on the polarization of the image, hence two images 72 and 74 are projected continuously onto device 92, and are reflected in different directions (82' and 84') respectively to visor 15, so as to compose a seamless, wide FOV angle, full image of the two polarized fractions of the source image. The FOV angle of the composed image equals substantially to twice the original FOV angel of the relay optics. In this embodiment the EO lens is not needed, since no switching in time is employed. In this embodiment no time-alternation is employed.

In the embodiments depicted in FIGS. 4A and 4B the polarized image frames 72 and 74 may be produced by two separated displays, or by only one common display (such as with a LCD display). The image source may be any type of display technology using P & S polarizers or LCD technology (such as from: Sony, Sharp, Kopin, MicroDisplay and others). The usage of the LCD technology is limited just for embodiments using polarized image frames by its nature of modulating the original light via light polarizing.

It is noted that the embodiment depicted in FIG. 4A provides time integration of the produced image. Conversely, the embodiment depicted in FIG. 4B allows for integration in space.

Using polarized angles other than 900 can allow for the manipulation of more than two images, but requires additional polarizers to cut the undesired polarized images.

In yet another embodiment, the distinction of one image fraction from another may be done using different wavelengths for each image fraction. In this embodiment image source 30 and image redirector 40 of FIG. 2A may employ cut-off filters to eliminate undesired images in time-domain using wavelength based filters, providing for ability to produce color images.

Figure 5:
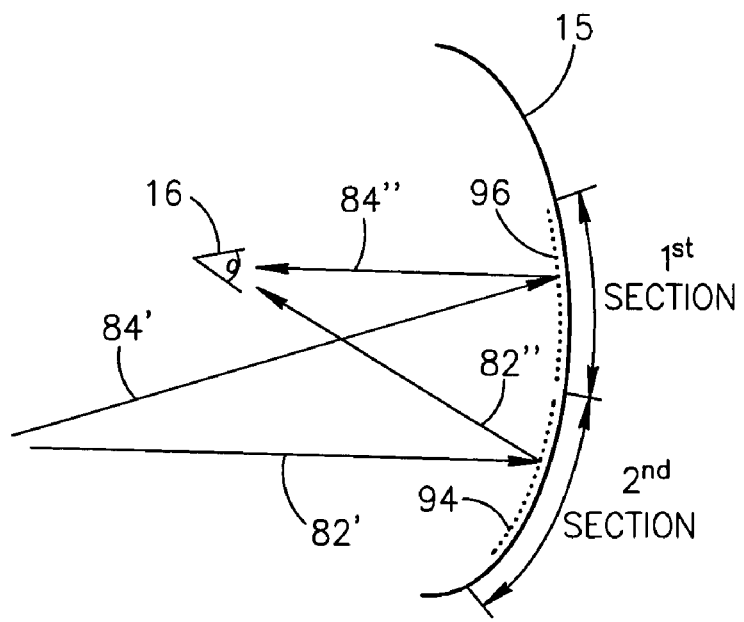
FIGS. 5 is a schematic illustration of a combination of the current invention with the diffractive optics.

Reference is now made to FIG. 5, illustrating yet another embodiment of the present invention. FIG. 5 depicts a visor 15 having diffractive optics 94 and 96 formed therein. Since the visor 15 is the last optical element before the eye, improving this element (the visor) improves the over-all system performance. Additionally, by adding the diffractive optics to the visor, it is possible to remove some of the optics from within relay optics 10, creating a lighter unit. The eventual composition of relay optics 10 depends on the choice of diffractive optics formed into the helmet, and on the synergism therewith.

Techniques to produce diffractive lens from/on the visor may be:
etching
diamond turning
lithography
molding In yet another embodiment, the outer visor surface may get an "opposite" optical power to generate a normal (optical power "0") see-through capability. This can be done by implementing diffractive optics on the visor's outer side.

Using the same optical relay 10 to achieve a non-distorted wide-FOV imagery, the field correction can be done by reverse-image correction manipulation on the image source such that the projected image to the eye will be non-distorted, or the correction can be done on the reflected element 15 (visor/combiner) by using a powered reflected optical element such as diffractive, hologram, binary optics.

The image correction can be done by a mixed element part on the image source (possibly by image processing electronic device such as DSP) or through the optical relay and/or the visor/combiner.

It is noted that the current invention is not limited to the embodiments described herein above, and alternate embodiments will become apparent to those skilled in the art to which the present invention pertains without departing from its spirit and scope. Accordingly, the scope of the present invention is described by the below-appended claims, and supported by the foregoing description.

The invention claimed is:

1. Apparatus comprising:
an image source to produce along a common optical axis at least first and second complementary images differing in at least one optical property selected from the group consisting of polarization and wavelength;
relay optics having a relay optics field of view associated with said images; and
a redirecting unit coupled to said image source to direct at least said first and second images to at least first and second different, respective, spatial regions of a reflecting unit based on said different optical property, thereby to enable viewing at least said first and second images together by an eye of a viewer as an integrated image having a field of view wider than said relay optics field of view.

2. The apparatus of claim 1, wherein said reflecting unit comprises diffractive optics formed therein.

3. The apparatus of claim 2 wherein said diffractive optics comprises binary optics.

4. The apparatus of claim 2 wherein said diffractive optics comprises holograms.

5. The apparatus of claim 2 wherein said diffractive optics comprises optic-powered implemented optics.

6. The apparatus of claim 1 wherein said reflecting unit comprises diffractive optics on its inner and outer faces so to create a total zero optical power for the outer scene.

7. The apparatus of claim 1 wherein the number of said images is at least two.

8. The apparatus of claim 1, wherein said images are of different wavelength.

9. The apparatus of claim 8, wherein said redirecting unit comprises a wavelength selective reflecting device.

10. The apparatus of claim 1, wherein said images are of different polarization.

11. The apparatus of claim 10, wherein said redirecting unit comprises a polarization selective reflecting device.

12. The apparatus of claim 1 wherein said first and second different respective spatial regions of said reflecting unit are adjacent to each other.

13. The apparatus of claim 1 wherein said image source is able to sequentially produce said first and second complementary images.

14. The apparatus of claim 1, wherein said image source is adapted to simultaneously produce said first and second complementary images.

15. The apparatus of claim 14, wherein said image source comprises at least first and second image generating devices to produce said first and second complementary images and a combiner to combine onto said common optical axis said first and second complementary images.

16. Apparatus comprising:
an image source to produce along a common optical axis at least first and second complementary images;
relay optics having a relay optics field of view associated with said images; and
a redirecting unit coupled to said image source to direct at least said first and second images to at least first and second different, respective, spatial regions of a reflecting unit, thereby to enable viewing at least said first and second images together by an eye of a viewer as an integrated image having a field of view wider than said relay optics field of view,
wherein said redirecting unit comprises a controllable tilting mirror.

17. A helmet comprising:
a reflecting unit with operative connection to said helmet;
an image source to produce along a common optical axis at least first and second complementary images differing in at least one optical property selected from the group consisting of polarization and wavelength;
relay optics having a relay optics field of view associated with said images; and
a redirecting unit coupled to said image source to direct at least said first and second images to at least first and second different, respective, spatial regions of said reflecting unit based on said different optical property, thereby to enable viewing at least said first and second images together by an eye of a viewer as an integrated image having a field of view greater than said relay optics field of view.

18. The helmet of claim 17, wherein said reflecting unit comprises diffractive optics formed therein.

19. The helmet of claim 18, wherein said diffractive optics comprises binary optics.

20. The helmet of claim 18 wherein said diffractive optics comprises holograms.

21. The helmet of claim 18 wherein said diffractive optics comprises optic-powered implemented optics.

22. The helmet of claim 17 wherein said reflecting unit comprises diffractive optics on its outer faces so to create a total zero optical power for the outer scene.

23. The helmet of claim 17, wherein the number of said images is at least two.

24. The helmet of claim 17, wherein said images are of different wavelength.

25. The helmet of claim 24, wherein said redirecting unit comprises a wavelength sensitive reflecting device.

26. The helmet of claim 17, wherein said images are of different polarization.

27. The helmet of claim 26, wherein said redirecting unit comprises a polarization selective reflecting device.

28. The helmet of claim 17 wherein said first and second different respective spatial regions of said reflecting unit are adjacent to each other.

29. The helmet of claim 17 wherein said image source is able to sequentially produce said at least first and second complementary images.

30. The helmet of claim 17, wherein said image source is adapted to simultaneously produce first and second complementary images.

31. The helmet of claim 30, wherein said image source comprises at least first and second image generating devices to generate said first and second complementary images and a combiner to combine onto said common optical axis said first and second complementary images.

32. A helmet comprising:
a reflecting unit with operative connection to said helmet;
an image source to produce along a common optical axis at least first and second complementary images;
relay optics having a relay optics field of view associated with said images; and
a redirecting unit coupled to said image source to direct at least said first and second images to at least first and second different, respective, spatial regions of said reflecting unit, thereby to enable viewing at least said first and second images together by an eye of a viewer as an integrated image having a field of view greater than said relay optics field of view,
wherein said redirecting unit comprises a controllable tilting mirror.

33. A method for producing a wide field of view, said method comprising:
producing along a common optical axis at least first and second complementary images differing in at least one optical property selected from the group consisting of polarization and wavelength;
optically transferring said complementary images through relay optics having a relay optics field of view; and
directing at least said first and second images to at least first and second different, respective, spatial regions of a reflecting unit based on said different optical property to enable viewing at least said first and second images together by an eye of a viewer as an integrated image having a field of view wider than said relay optics field of view.

34. The method of claim 33, wherein directing said images to said spatial regions of the reflecting unit comprises directing said images to said spatial regions of the reflecting unit based on polarization of said images.

35. The method of claim 33, wherein directing said images to said spatial regions of the reflecting unit comprises directing said images to said spatial regions of the reflecting unit based on wavelength of said images.

36. The method of claim 33 comprising sequentially producing said at least first and second complementary images.

37. The method of claim 33, wherein said producing comprises simultaneously producing said first and second complementary images.

38. The method of claim 37, wherein said simultaneously producing said first and second complementary images comprises:
generating said first and second complementary images; and
combining said first and second complementary images onto said common optical axis.

* * * * *